Jan. 18, 1966   A. B. J. CLARK   3,230,450
SCREEN FOR PROJECTILE DETECTION USING
ALTERNATE, SPACED SWITCH ELEMENTS
Filed Sept. 28, 1961
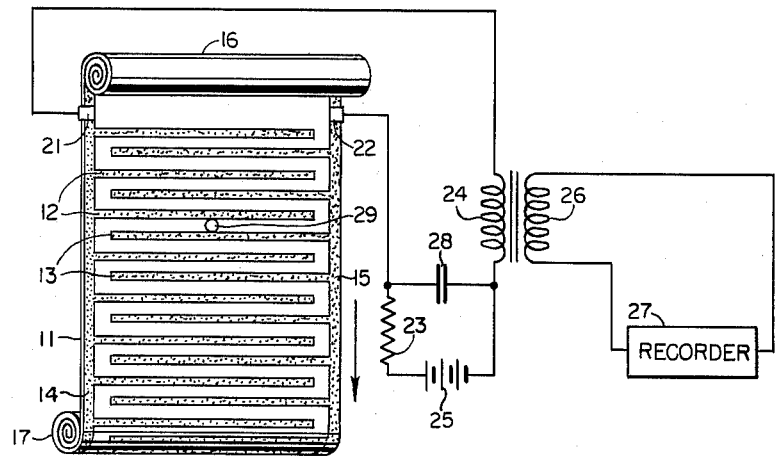
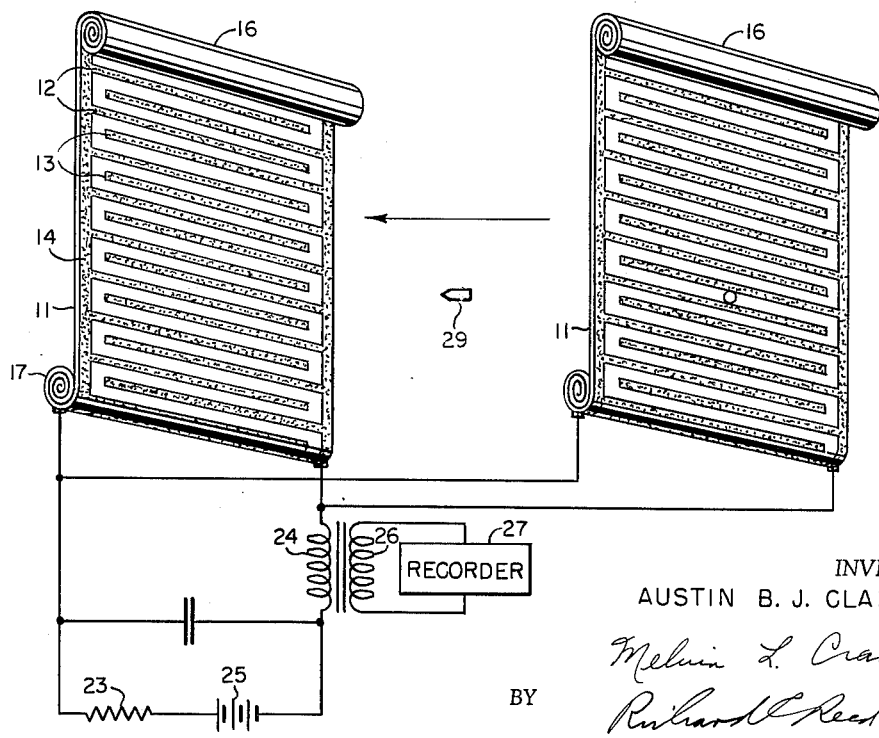
INVENTOR
AUSTIN B. J. CLARK
BY
ATTORNEY 3,230,450
SCREEN FOR PROJECTILE DETECTION USING ALTERNATE, SPACED SWITCH ELEMENTS
Austin B. J. Clark, 6731 Appletree Lane, Oxon Hill, Md.
Filed Sept. 28, 1961, Ser. No. 141,549
1 Claim. (Cl. 324—70)
(Granted under Title 35, U.S. Code (1952), sec. 266)

The invention described herein may be manufactured and used by or for the Government of the United States of America for governmental purposes without the payment of any royalties thereon or therefor.

The present invention relates to a velocity measuring device and more particularly to the surface by which a projectile is detected and the velocity measured.

Heretofore various means have been used for detecting a projectile as it passes through an electrically conductive surface. These devices fall into two various classes, one in which an electrical contact is broken to control a relay which controls a circuit to a recorder and another type which has spaced electrodes in which the projectile passing through the spaced electrodes make an electrical contact between the two electrodes to complete a circuit to a recording device. Devices that make use of the first example comprise a plurality of equally spaced parallel wires connected to form a single continuous electrical conductor so that the breakage of any portion of the wire will cause a break in the electrical circuit. Another type makes use of a continuous circuit made in the form by a printed circuit type wherein a projectile passing through any one of the continuous lines break the circuit to control the recorder system. The second example set forth above makes use of two conductive screens separated by an insulating material wherein the screens are connected in a suitable electrical circuit. A projectile passing through the device makes contact with the two screens simultaneously to close the circuit and operate a recording device connected in the circuit. These devices have their disadvantages wherein in the break type, the target must be replaced after each shot in order to have a completed circuit to carry out the detection. In the second example one of the basic disadvantages is, as the projectile passes through the first screen, it pushes the wire through the insulating material such that it makes connection with the second screen to cause a permanent short circuit. In using the second example device a plurality of shots can be recorder in so long as a short circuit is not made between the two screens separated by the insulating material.

The present invention overcomes the disadvantages of the prior art devices by making use of a single surface in the form of a sheet of paper or any other suitable support upon which alternating positive and negative electrode surfaces have been applied thereto such as by a silk screen process. Each of the alternating electrode surfaces are connected with separate continuous lines and then to a suitable high voltage potential. The circuit is completed by a projectile passing through the support making contact with adjacent negative and positive electrodes. Any number of projectiles can be fired through the support and detected since each of the adjacent positive and negative electrodes are connected to a continuous line on the base support. Such a conductive surface can be applied to a continuous sheet of insulating paper and then rolled into a roll wherein a clear target can be rolled out at any desired time to present a clean target. A single support having the conductive electrodes painted thereon can be used as a projectile detector to determine a hit on the target. The placement of two screens a known distance apart can be used to determine the velocity of a projectile which first strikes the first screen and then the second screen wherein a pulse is produced by each of the screens as the projectile passes therethrough and completes an electrical circuit.

It is therefore an object of the present invention to provide a single surface grid type screen on a support base having alternating positive and negative electrodes.

Another object is to provide a velocity determining device which is portable, compact, economical and can be used for a plurality of velocity determinations.

Still another object is to provide a device which will insure detection and velocity determinations of projectiles without the possibility of a short circuit in the system due to impact by the projectile.

Yet another object is to provide a grid type screen which can be supplied as a continuous roll to readily present a clean target after a plurality of shots.

While still another object is to provide a simple, economical, inexpensive target for detecting and for determining the velocity of a projectile.

Other and more specific objects of this invention will become apparent upon a more careful consideration of the following detailed description when taken together with the accompanying drawings, in which:

FIG. 1 illustrates a target structure in accordance with the present invention illustrating the alternating positive and negative electrodes thereon and the associated electrical circuitry which detects a projectile that strikes the target.

FIG. 2 illustrates a device using two projectile detector surfaces spaced a specific distance apart in order to determine the velocity of a projectile passing through the detector surfaces.

Now referring to FIG. 1 there is illustrated an example of the present invention which comprises a base support 11 of electrically insulating material upon which alternating electrodes 12 and 13 have been applied thereto by a silk screen or any other suitable method. The edge of the base support has applied thereto continuous conductive strips 14 and 15 which connects respectively with the alternating electrodes 12 and 13 applied to the surface thereof. The projectile detector is shown as being in a feed roll 16 which is fed onto a takeup roll 17 by any suitable means not shown for simplification of the drawings. Any suitable electrode contacts 21 and 22 are used to connect an electrical circuit with the continuous strips 14 and 15. The electrodes 21 and 22 are held in contact with the continuous strips 14 and 15 by any suitable means such that when the detector surface is rolled upon roll 17 the contacts will remain in contact with the continuous strips. The electrical circuitry connected with electrodes 21 and 22 comprises a load resistor 23 and the primary windings 24 of a transformer in series with a high voltage supply 25 with a capacitor 28 connected in parallel with the voltage supply. The secondary windings 26 of the transformer are connected with a suitable voltage pulse recorder 27 such that a voltage pulse in the electrical circuitry will be transferred through the transformer to the recorder.

In operation, for example to detect a projectile that hits the detector, a projectile 29 is fired which strikes the detector surface. As the projectile 29 passes through the detector surface the projectile makes contact with adjacent electrodes 12 and 13 to act as a switch to complete the electrical circuit through side strips 14, 15 and the contacts 21 and 22. When the projectile contacts electrodes 12 and 13 to complete the circuit current flows through the primary winding of the transformer wherein a voltage pulse is produced in the transformer and recorded by the recorder 27. The projectile detector surface can remain in the same position for a plurality of shots wherein each projectile that hits the projectile detector surface will produce a pulse on the recorder as the projectile passes through the surface and makes contact with electrodes 12 and 13. At such time a clean projectile detector is desired, the takeup roll can be rotated to feed out a new surface which can be used to detect a plurality of additional projectile hits. In order to protect the feed roll and the electrodes 21 and 22 from a possibility of being hit by a projectile, it is preferred that a protective covering be provided over these surfaces on the side from which the projectiles are fired.

FIG. 2 illustrates the use of two projectile detector surfaces spaced a specific distance apart and connected in parallel to the electrical circuitry as shown in FIG. 1 such that the arrangement can be used to determine the velocity of a projectile passing through the two detector surfaces. The projectile passes through the first surface which produces a voltage pulse which is recorded and subsequently when passing through the second detector surface produces a second voltage pulse which is also recorded. By determining the spacing of the voltage pulses on the recorder and knowing the rotational velocity of the recorded and the distance between the two detector surfaces, the velocity of the projectile can be determined.

The spacing between the electrodes on the support base is dictated by the projectile size which is to be detected. Obviously the spacing must be less than the diameter of the projectile. Such a structure can be used to detect any metallic object passing through the surface thereof making contact with the adjacent electrodes on the support surface. It is well known in the art to use plastic projectiles to run a test therefore when using a plastic or a projectile made of a non conducting material, the projectile must be coated over a portion of its surface with a conductive coating such that an electrical contact will be made between adjacent electrodes as the projectile passes through the support.

Obviously any base support of nonconductive material upon which alternating electrodes are applied can be used to carry out the teachings of the present invention. Such detector surfaces will detect a plurality of projectiles hitting the surface thereof which necessitates changing the detector surface only after a substantial number of shots.

Obviously many modifications and variations of the present invention are possible in the light of the above teachings. It is therefore to be understood that within the scope of the appended claim the invention may be practiced otherwise than as specifically described.

What is claimed is:

A device for determining the velocity of an electrically conducting projectile which comprises two parallel projectile detector surfaces separated by a specific predetermined distance, each of said detector surfaces comprising a support base formed of an insulating material, alternate first and second interleaving conductors inseparably applied onto the same surface of said support base, a first continuous conductor applied along an edge of said support base in electrical contact with said first interleaving conductors, a second continuous conductor applied along an opposite edge from said first continuous conductor in electrical contact with each of said second interleaving conductors, each of said first and second interleaving conductors being spaced from each other in parallelism with the spacing between each of said first and second interleaving conductors being less than the diameter of a projectile to be detected with one end of each of said first interleaving conductors being spaced from said second continuous conductor and one end of each of said second interleaving conductors being spaced from said first continuous conductor, said first and second continuous conductors along opposite edges of said support surface being parallel to each other, an electrical potential connected in parallel with said first and second conductor strips on each of said parallel projectile detectors separated by a specific predetermined distance, and a recorded electrically connected with each of said projectile detector surfaces operative by a projectile making contact with adjacent interleaving conductor strips on each of said detector surfaces as the projectile passes successively through each of said first and second spaced projectile detectors separated by a specific distance, whereby the velocity of a projectile is determined from the specific distance between said detector surfaces and the time of travel of said projectile between said detectors as indicated by said recorder.

References Cited by the Examiner

UNITED STATES PATENTS

| | | | |
|---|---|---|---|
| 2,294,730 | 9/1942 | Eggers | 324—70 |
| 2,587,775 | 3/1952 | Sheldon | 324—70 |
| 2,819,085 | 1/1958 | Brown | 273—102.2 |
| 2,907,841 | 10/1959 | Campbell | 340—235 |

WALTER L. CARLSON, *Primary Examiner.*

R. V. ROLINEC, M. J. LYNCH, *Assistant Examiners.*